Oct. 11, 1938.                J. A. PARENT                2,133,176
                          UNIVERSAL DRIVING JOINT
                          Filed Dec. 19, 1936          5 Sheets-Sheet 1
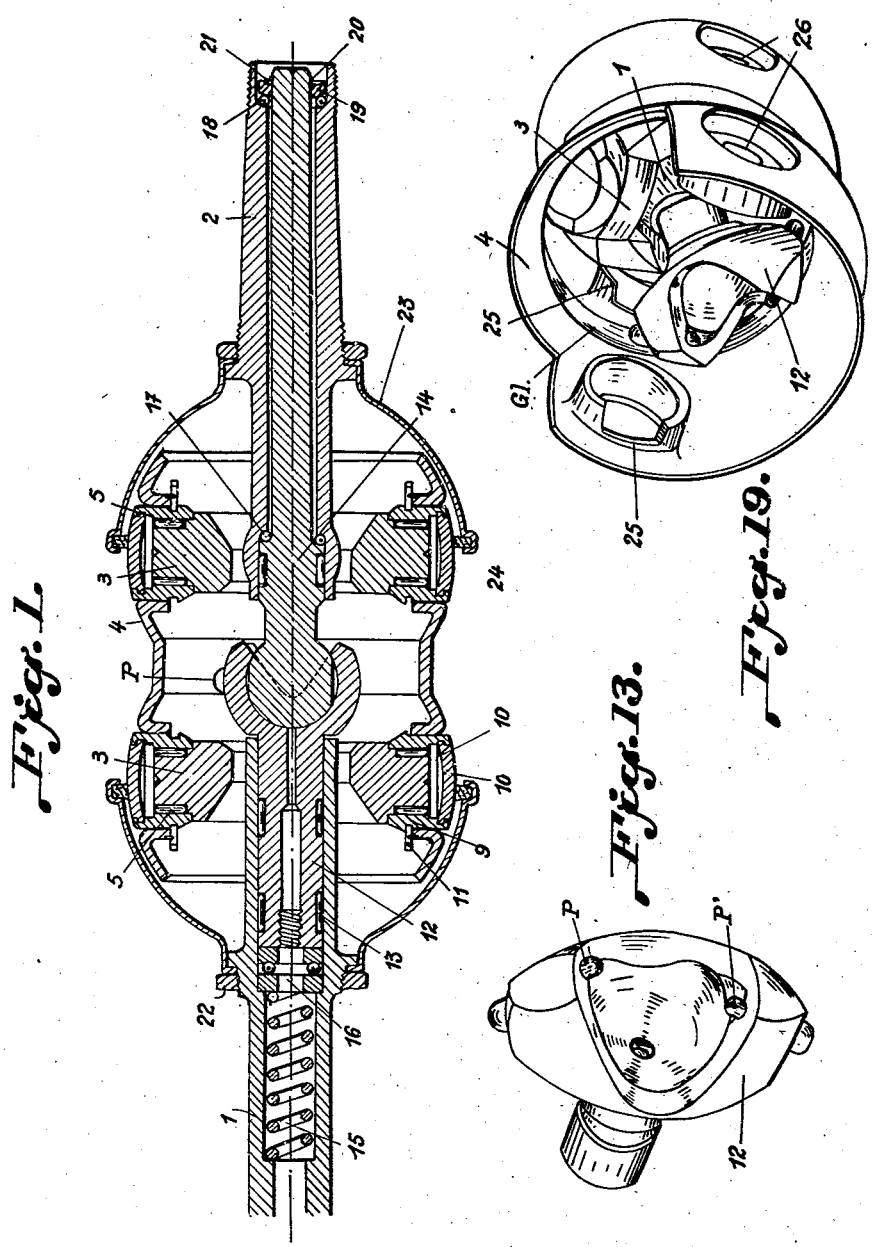
Inventor:
Jacques Auguste Parent
By Alber Jarvis
       Attorney

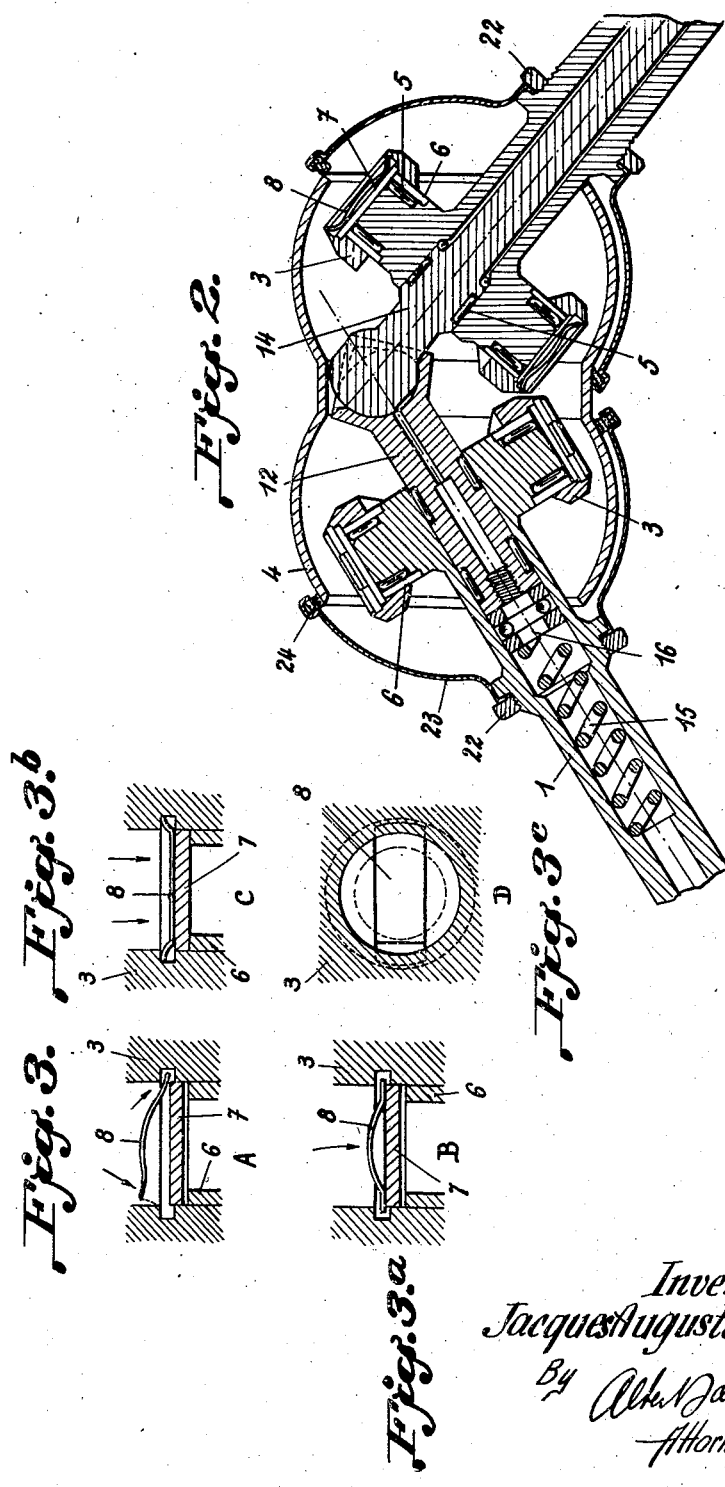

Oct. 11, 1938.  J. A. PARENT  2,133,176
UNIVERSAL DRIVING JOINT
Filed Dec. 19, 1936   5 Sheets-Sheet 3
Fig. 14.
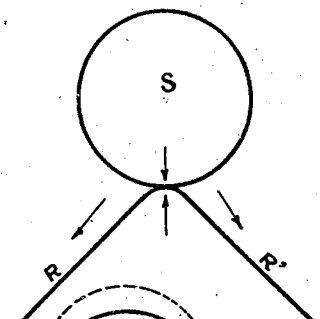
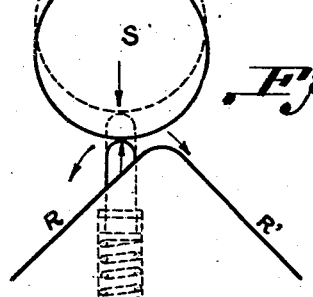
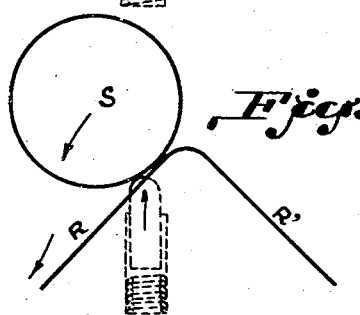
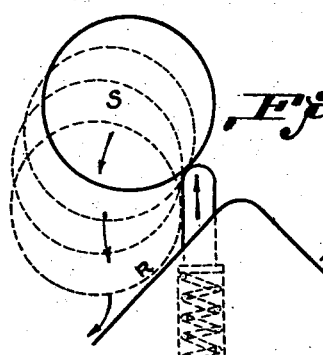
Fig. 15.
Fig. 16.
Fig. 17.
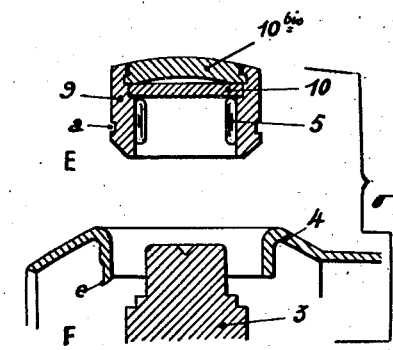
Fig. 4.
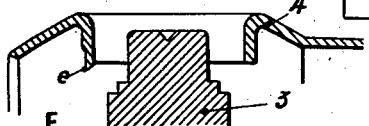
Fig. 4a.
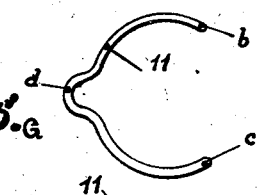
Fig. 4b.
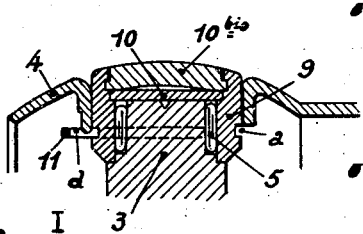
Fig. 4c.
Fig. 18.
Inventor:
Jacques Auguste Parent
By [signature]
Attorney Oct. 11, 1938.　　　J. A. PARENT　　　2,133,176
UNIVERSAL DRIVING JOINT
Filed Dec. 19, 1936　　5 Sheets-Sheet 4
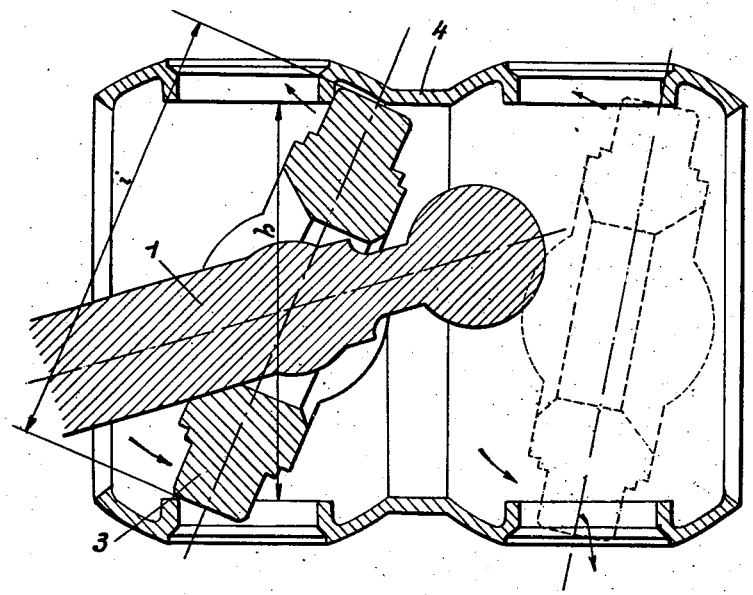
Fig. 5.
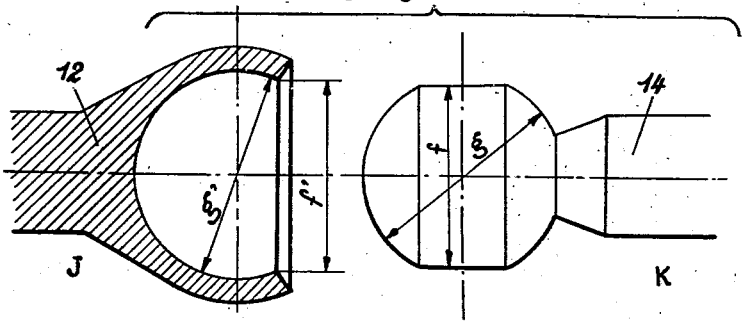
Fig. 6.
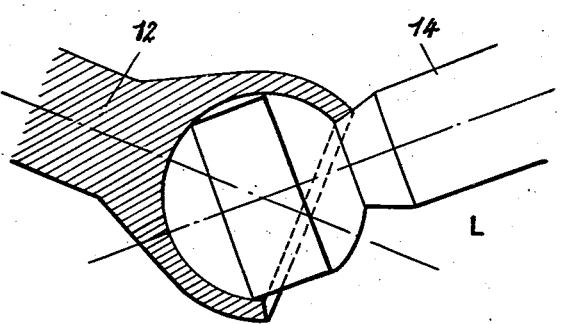
Fig. 6ª.
Inventor:
Jacques Auguste Parent
By
Attorney

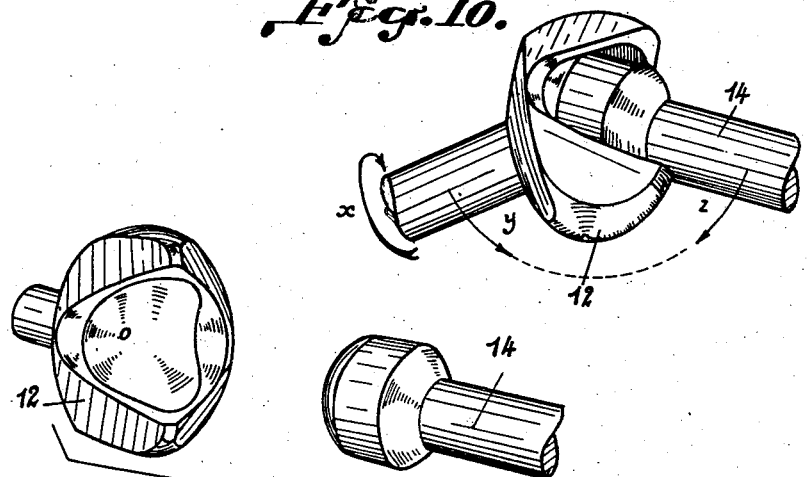
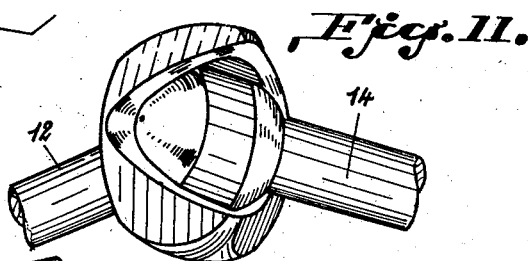
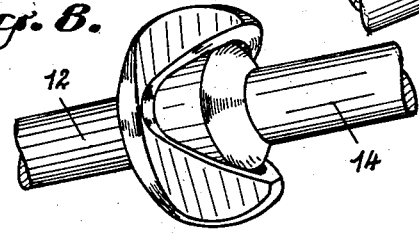
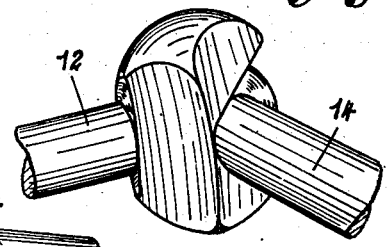
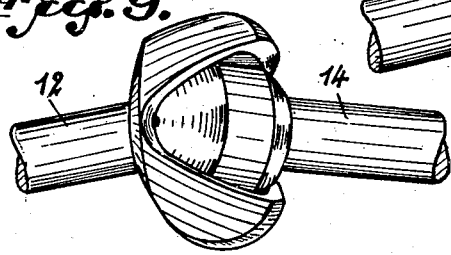

Patented Oct. 11, 1938

2,133,176

UNITED STATES PATENT OFFICE 2,133,176

UNIVERSAL DRIVING JOINT

Jacques Auguste Parent, Paris, France

Application December 19, 1936, Serial No. 116,677
In France December 21, 1935

5 Claims. (Cl. 64—17)

Without serious disadvantages, it is impossible with simple universal driving joints to exceed or even to reach 45° angle between the driving and the driven shaft.

When necessary to exceed this angle of 45°, the constructor is therefore led to utilize two joints connected by an intermediate part.

This solution further presents the advantage, for joints in which the link axes are not constantly in bisecting plane, of making it possible to neutralize the angular speed variations; this is the case as regards the double Cardan or Hooke joint.

In ordinary mechanics, therefore, the problem may be considered as having been solved centuries ago. The essential condition is, whatever the type of joint used, to maintain the driving and driven shafts in such a way that their axes remain in concurrent position approximating as far as possible to the bisecting plane.

But, if this condition is relatively easy to fulfill in the majority of drives, by utilizing bearings and other known devices, this is not the case when the engine power has to be transferred to the fore-wheels of a motor vehicle, and when the latter are already driving wheels.

As a matter of fact, the action of the steering combined with that of the suspension necessitates perfect mobility in all planes, and it is extremely difficult to maintain in a concurrent position the axes of the driving and driven shafts.

The devices hitherto employed with a view to obtaining this result limit the turning cycle to very small angles.

Certain solutions consist in enclosing the double joint in a kind of spherical articulated carter.

In other cases, the shafts are prolonged and connected with each other by means of a ball and socket articulation; the apparatus which forms the object of the present invention belongs to the latter type. It is a considerable improvement on the systems already known, in so far as it permits, owing to the devices described below, of the efficient transmission of the driving power at an angle reaching and even exceeding 75°.

Fig. 1 shews an axial section of the link-pins of the cross-pieces the general plan of the joint when the two shafts are in a straight line position.

Fig. 2 shews an axial section of the link-pins of the shafts the general plan of the joint when the two shafts are in an angular position of about 105°.

Fig. 3 shews in A, B, C, and D the mounting of the braking device on the checks.

Fig. 4, which is composed of elements E, F, G, H, and I shews the device designed to keep in position the ball bearing rings after introduction in the intermediate part.

Fig. 5 shews how to insert the cross-piece into the intermediate part.

Fig. 6, composed of elements J, K, and L, shews schematically the device proposed in order to avoid the dislocation of the ball.

Fig. 7 shews the ball and socket before the former is inserted in the latter.

Fig. 8 shews the ball in the socket, the shafts being in the straight line position.

Fig. 9 shews the same parts when the shafts begin to enter the angular position.

Fig. 10 shews more marked angularity of the two shafts when the V slope of the socket comes into contact with the ball bearing shaft.

Fig. 11 is a front view of the ball bearing shaft, which, at its maximum inclination, reaches the basis of the socket.

Fig. 12 is a back view of the shafts in the same position.

Fig. 13 shews, in perspective, the spherical socket with its two spring tappets.

Fig. 14 indicates schematically the neutral position in the functioning of the articulated ball, when the spherical socket is not fitted with spring tappets.

Fig. 15 shews the spring tappet coming into contact with the ball shaft.

Fig. 16 shews the tappet at the moment of yielding.

Fig. 17 shews the movement of the ball shaft in the V-shaped opening of the spherical socket.

Fig. 18 shews the shaft pushed beyond the neutral position by the tappet.

Fig. 19 shews, in perspective, a part section of the intermediate part 4, shewing also the cylindrical part through which the ball glides into the spherical socket 12.

Figs. 1 and 2 shew in cross section the general plan of the parts constituting a double Cardan joint, selected as example and fitted with the improvements forming the object of the present invention.

In 1 we see the driving shaft which drives the driven shaft 2. These shafts, each of which is fitted with a link-pin, are further fitted with cross-pieces 3 which drive an intermediate part 4 in the form of a double sphere. The shaft-pins 1 and 2 rotate either in smooth bearings, ball-bearings or inside a row of fingers 5 which move within the rings 6 fitted into the cross-pieces 3. These rings contain disks 7 which act as a check on the shaft-pins 1 and 2; the cross-pieces also rotate inside a collar 9, also obstructed by a check-disk 10 held in place by the die-cast part 10bis.

To maintain this part in position 9, it is grooved so as to permit of the insertion of a spring in the form of a staple 11.

A part axle 12 manufactured in the form of a spherical socket with a transversal V-shaped notch and forming the prolongation of a pivot fitted with two bearings 13, may, thanks to this pivot, rotate on the hollow end of the shaft 1. In the shaft 2, also hollow, is inserted a part or axle 14 mounted in a series of rollers 5' and against two ball checks 17 and 18 which enable it to turn freely. The lateral displacement of the ball checks is regulated by a socket 19 fixed on part 14 by means of a spring collar 20. A round part 21 of variable thickness completes the device. A spring 15 acting on a ball check 16 drives the spherical socket 12, which moves longitudinally in the shaft 1 and is thus maintained in permanent contact with the sphere terminated in the part 14.

On each of the shafts 1 and 2 there is a semispherical cap fixed by nut and fitted with a felt joint.

In Fig. 1, the shafts 1 and 2 are in a position of mutual prolongation.

In Fig. 2, the shafts 1 and 2, being in a relative position represented by an angle of about 75°, we see that the part 12, bearing the spherical socket commanded by the spring 15 has been driven by the sphere of the part 14 and that these two organs are maintained in contact, the socket and the sphere being in a concentric position. Moreover, the cylindrical section of the part 14 has taken up its position in the V designed at the extremity of the part 12 and, as it will be shewn hereafter, the ball cannot emerge from the spherical socket.

In this position the shafts 1 and 2 continue to turn without driving the parts 12 and 14, which remain fixed being in mutual connection and having no contact with the shafts except through the cam bearings and the ball checks. The latter absorbing all reactions facilitate, owing to the absence of friction, an extremely efficient transmission of power.

The functioning of the ball composed of parts 12 and 14 is explained in the Figures 6 to 19.

The elements A, B, C, and D of Fig. 3 shew the mounting and functioning of the braking of the check-disks 7.

In A, we see that the brake 8 the plan of which shewn in element D of Fig. 3, has the form of a rectangle of which the two shorter sides are rounded; the middle is cambered and the two ends are flat. Moreover, the length of this part is slightly less than the diameter of the groove in the cross-piece 3 and greater than the bore of the same cross-piece, a fact which makes it necessary to insert it sideways if it is to take up the position in the groove indicated in figure A. It then takes the position shewn in B. A sharp knock in the middle from the outside as shewn in C is sufficient to flatten the cambered part and thus to increase the length of the braking device. The two flat sections of the extremities rise and are wedged in the groove of the cross-piece exercising sharp pressure on the check-disk 7 which limits the displacement of the sockets 6. To withdraw this brake all that is necessary is to reestablish to some extent the cambered part by inserting the blade of a screw-driver between the check-disk and the brake 7.

Elements E, F, G, H and I of Fig. 4 shew the mounting of the part 9 formed of the check-disk which is held in position by part 10bis. This part which is of a rounded form is forcibly inserted in part 9; under the pressure brought to bear upon its centre, it flattens out, thus increasing the diameter, and enters the corresponding groove of part 9.

In E, part 9 is shewn, fitted with rollers, and so arranged as to cover one of the pins of the crosspiece inserted in the opening in the intermediate part 4 as described later (see Fig. 5).

In F, we see, in the inside of the chamber in part 4, the catch e, which, placed in the internal part of the loop d of the collar spring 11, shewn in G in plane and in H in position prevents the latter from turning when inserted in the circular groove of part 9. The loop d, which gives flexibility to branches b and c, also permits of withdrawing the collar by means of a hook through the opening in the intermediate part 4.

In I, we see part 9, mounted in part 4 on the pin of the cross-piece.

The shaft 1, mounted on the cross-piece 3, the length of the pins I being appreciably greater than the distance H between the two chambers in the intermediate part designed to receive parts 9, is inserted sideways as shewn by the arrows on Fig. 5.

In dotted lines in the same figure, we see the second phase of the movement which has brought one of the pins into one of the chambers of part 4; the other pin then gains easily the lower part of the second chamber. All that is now necessary is to bring the cross-piece into the axis of the two chambers (in F, Fig. 4, plate I) and to cover each of the pins with part 9, as shewn in E, Fig. 4.

Element K of Fig. 6, which shews a diagram of the spherical end of part 14, also shews that the diametric sphere g has been manufactured parallel to the axis of the part in order to obtain the cylinder bore f. The spherical socket 12, shewn in J, of which the internal diameter g' is equal to the diameter of the sphere 14, has an opening f', which hardly exceeds the diameter f of the cylindrical part of the piece 14. It is therefore clear that these two parts cannot be inserted the one in the other except in a given position, i. e. when their axes are definitely in a position of mutual prolongation. As soon as an angle of a few degrees is formed between these parts, it becomes impossible, as can be seen in element L of Fig. 6, to withdraw the sphere from the spherical socket.

At the beginning of the turning cycle, parts 12 and 14 driven by the rotation of the shafts 1 and 2, also turn on their respective axes until one of the branches of the V-shaped opening of the socket comes into contact with the tail of the part 14. This position is shewn in Fig. 10.

As contact is only established at one point which is not included in the axis of the rotation of the part 12, a couple ensues which results in the immediate rotation of the cylindrical part 14 on the gradient of part 12 which acts as a cam. The shafts 1 and 2 continue their inclination during the turning cycle, and the tailpart of part 14 rolls as described above in the inside of one of the branches of the V, finally entering fully the groove as shewn in Figs. 11 and 12.

As specified above, each of the branches of the V opening of the socket 12 acts as a cam and as such has a neutral point. This neutral point is reached, when the right branch including the two ends of the V is in the plane determined by the two axes of rotation of parts 12 and 14.
To avoid this disadvantage, the arm of each of the branches of the V-shaped opening of the socket has been fitted with a spring tappet, shown in P and P' of Fig. 13, whose functioning is schematically explained in Figs. 14, 15, 16, 17 and 18.

R and R' represent the gradients of one of the branches of the V-shaped opening 12, O the extremity of this part and s the section of the ball shaft 14; Fig. 14 shews what can happen if there are no spring tappets. A pressure is exercised in the direction of the arrow at point b, which re-acts, thus establishing equilibrium. Since it is impossible to pass beyond this position, the turning cycle is considerably reduced.

On the contrary, when the device is fitted with spring tappets, the neutral point is confined to the position of equilibrium which presents itself when the centre of the pressure coincides exactly with the axis of the tappet. This case is shewn in Fig. 15. It is easy to see that owing to the pressure exercised on the tappet the latter recoils until it disappears; at this moment (shewn in Fig. 16), the sphere comes into contact with the gradient R and glides to the end of the gradient without interrupting the movement.

In Fig. 17 the sphere has come into contact with the tappet outside its vertical axis, the spring re-acts and drives the sphere on to the gradient R.

In Fig. 18 we see the same contact with the tappet which throws the sphere into a position beyond neutral b and makes it slide on to the gradient R'.

In Fig. 19 it is seen that when shafts 1 and 2 have attained their maximum angle, the round of the socket 12 which presents itself in the form of a cylinder with the same radius as that of the intermediate part 4, comes into contact with the latter, which serves it as a gradient GI and thus limits the turning cycle by forming a check-stop of absolute reliability.

Part 4, which is shewn in Fig. 19, has a peculiarity which is visible neither in Fig. 1 nor in Fig. 5. This consists of notches 25 and 26 made in the tubes enclosing the pins of the cross-pieces. The object of these notches is to facilitate the mounting of these pins. For each of the half-spheres, they are, therefore diagonally opposed. Further, they are conceived in a plane perpendicular to that of rotation, i. e. to the position in which the enclosing parts necessitates a minimum of resistance.

It is evident that the invention is not confined to realization according to the example given above; the Cardans selected as being the most robust and least cumbrous device can be replaced by nut or ball joints, or even by spring systems or flexible devices. It is also possible to effect detailed modifications which may or not be necessary for the utilization of the apparatus without digressing from the principle of the invention.

I therefore claim:

1. A universal driving joint including a casing, a driving shaft and a driven shaft extending therein, a driving cross-piece on the driving shaft, a driving cross-piece in the driven shaft, chambers in the casing forming bearings for the pins of the cross-pieces, chambers forming bearings in each cross-piece for the pin of the corresponding shaft, a ball and socket forming a sliding connection between the extremities of the shafts formed of a spherical male part and a socket female part, V-shaped openings in the said socket adapted to receive the shaft with the male part, and a spring tappet at the ends of the gradients formed by the V.

2. A universal driving joint as claimed in claim 1, including an axle bearing the male part of the joint, said male part being a sphere formed on and co-axial with said axle, a chamber in one of the shafts and receiving said axle, bearings for said axle inside the chamber and ball checks for the said axle.

3. A universal driving joint as claimed in claim 1, said sphere having a reduced cylindrical part, said socket having an opening slightly greater than the diameter of the reduced part of the sphere forming the male part, an axle forming a pivot bearing this spherical socket, a chamber in one of the shafts for this axle, bearings in this chamber for said axle, a ball check at the end of said axle, a spring acting on said check and urging said axle towards said male part.

4. A universal driving joint as claimed in claim 1, including notches, diagonally opposed two by two in the walls of the chambers containing the pins of the cross-pieces, the axis of the notches being in a plane perpendicular to the plane of the rotation of the shaft-pins.

5. A universal driving joint as claimed in claim 1, with collars in the chambers provided in the hollow spheres forming bearings for the cross-piece pins, collars in the cross-pieces forming bearings for the shaft-pins, pincer-springs in connection with the collars, a catch holding in position the loop of one of these pincer-springs, a hard metal plate closing the collar and forming a check for the pin, a soft metal round element, a groove inside the collar for the said round element, a curved plate acting as a brake on the collars, a circular groove in the cross-piece for the said plate.

JACQUES AUGUSTE PARENT.